United States Patent [19]

Benavie

[11] 4,155,633
[45] May 22, 1979

[54] CORRECTIVE OPTICAL DEVICE FOR HOMONYMOUS HEMIANOPSIA

[75] Inventor: Jerold J. Benavie, Harrison, N.Y.

[73] Assignee: RCA Corporation, New York, N.Y.

[21] Appl. No.: 820,916

[22] Filed: Aug. 1, 1977

[51] Int. Cl.² .................... G02C 1/00; G02C 7/16
[52] U.S. Cl. ................................ 351/41; 351/158; 351/45
[58] Field of Search .............. 351/41, 45, 158, 1; 350/301

[56] References Cited

U.S. PATENT DOCUMENTS

| 2,255,197 | 9/1941 | Thomas | 351/41 |
| 3,684,380 | 8/1972 | Benchley | 350/301 X |

Primary Examiner—Paul A. Sacher
Assistant Examiner—Rodney Bovernick
Attorney, Agent, or Firm—Samuel Cohen; George J. Seligsohn

[57] ABSTRACT

Homonymous-hemianopsia corrective device, comprising first and second reflectors, provides corrected vision over an overall field of view which is greater than the limited angular field of view of uncorrected vision of a person suffering from homonymous hemianopsia.

Figure 1:
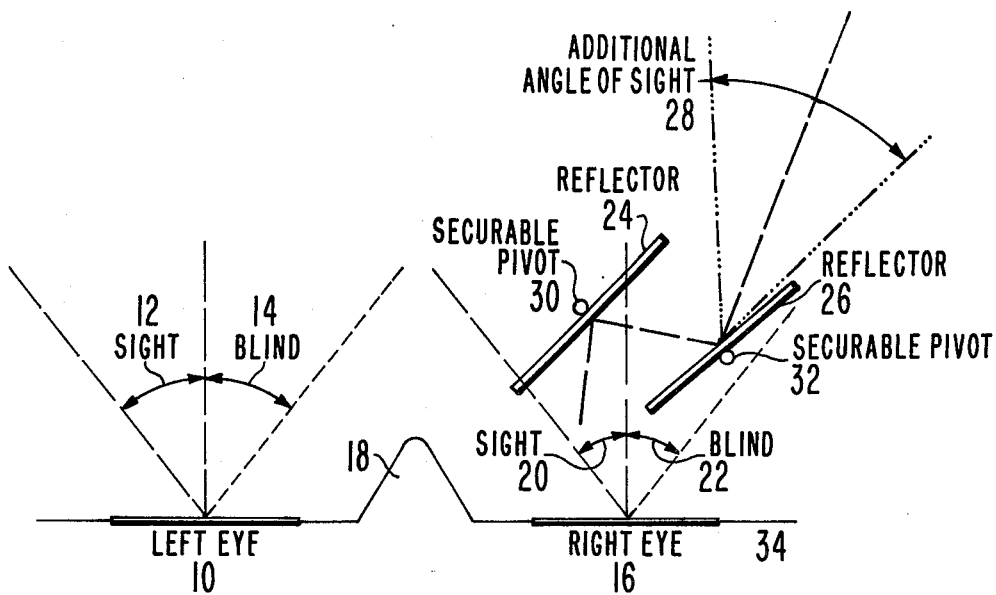

6 Claims, 5 Drawing Figures 24-1
PLANE MIRROR
REFLECTOR 26-1
PLANE MIRROR
REFLECTOR 24-2
CONCAVE
CYLINDRICAL MIRROR
REFLECTOR 26-2
CONVEX
CYLINDRICAL MIRROR
REFLECTOR

CORRECTIVE OPTICAL DEVICE FOR HOMONYMOUS HEMIANOPSIA

This invention relates to an optical corrective device for increasing the visual field of view of a person suffering from a partial blindness condition in both eyes, known as homonymous hemianopsia.

Homonymous hemianopsia is a medical term for a pathological condition which frequently results from stroke, brain tumors, or other types of brain injury. Specifically, a patient suffering from homonymous hemianopsia loses sight on the same side of the normal visual field of both eyes. For the patient, it means only half a world of vision from each eye. The patient is unable to see anything on the blotted-out side of the normal visual field without turning his eyes or head. A person suffering from homonymous hemianopsia finds reading difficult, especially persons suffering from right lateral homonymous hemianopsia (halfblindness on the right side of the visual field) when reading a language, such as English, which is written from left to right.

Various prior-art optical corrective devices for homonymous hemianopsia patients are discussed in the article "An Optical Approach to Aid Cerebral Hemiplegics" by T. W. Nooney, Jr., *MEDICAL COLLEGE OF VIRGINIA QUARTERLY*, Volume 8, No. 4 (1972) pp. 274–277.

The present invention provides an improved optical corrective device which substantially enlarges the overall field of view perceived by a person suffering from homonymous hemianopsia without producing a mirror image of observed object information. Therefore, the relative "left" and "right" orientation of observed object information is preserved, which is an essential requirement in the case of reading matter. Briefly, in accordance with the principles of the present invention, this is accomplished by the use of two spaced reflectors, which are disposed in front of only one of the two eyes in a manner such that one or both of the reflectors (1) block the direct field of view seen by only the single one of the eyes, i.e., the field that would be seen by the single one of the eyes in the absence of the corrective device, and (2) substitute therefor a virtual image of an additional horizontal angle of sight which is outside the uncorrected limited visual field of view of a person suffering from homonymous hemianopsia.

Figure 2A:
Figure 2B:
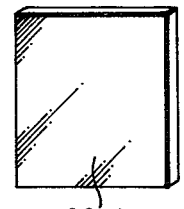
Figure 3A:
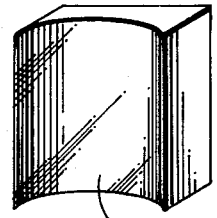
Figure 3B:
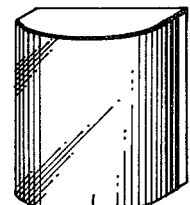

In the Drawings:

FIG. 1 schematically illustrates an embodiment of the present invention;

FIGS. 2a and 2b respectively illustrate a first species of each of the two reflectors of FIG. 1; and FIGS. 3a and 3b respectively illustrate a second species of each of the two reflectors of FIG. 1.

Although a person may suffer from either left-or right-lateral homonymous hemianopsia, right-lateral homonymous hemianopsia is assumed, for illustrative purposes, in the embodiment of the present invention which is shown in FIG. 1. As shown, left eye 10 has sight over left-eyesight angular portion 12 of the normal field of view of the left eye, but is blind over the right-angular portion 14 of the normal field of view. Similarly, the right eye 16, which is separated from left eye 10 by nose bridge 18, also has sight over the left-eyesight angular portion 20 of the normal field of view, but is blind over the right-angular portion 22 of the normal field of view.

As is known, the respective fields of view of the left and right eyes of a human being overlap to a great extent, thereby providing binocular vision. Therefore, in the case of a person suffering from right-lateral homonymous hemianopsia, the field of view of the right-eyesight angular portion 20 (in the absence of a corrective device) overlaps to a great extent the field of view of left-eyesight angular portion 12 to provide binocular vision over only a limited left-hand portion of the normal field of view. A corrective device, comprising reflector 24 and reflector 26, is disposed in front of right eye 16 for the purpose of blocking out the direct field of view of righteyesight portion 20 and substituting therefor a virtual image of the field of view of additional angle of sight 28. As indicated in FIG. 1, the field of view of additional angle of sight 28 coincides with at least a substantial part of the blind right angular portions 14 and 22 of the left and right eyes. Thus, the corrective device of the present invention is capable of substantially increasing the limited visual field of view of a person suffering from homonymous hemianopsia.

Reflector 24 includes securable pivot 30 and reflector 26 includes securable pivot 32 for attaching reflectors 24 and 26 to a suitable frame, not shown, which is similar to an eye-glass frame and which supports both reflectors 24 and 26 in proper position in front of the right eye of a patient wearing the corrective device. Securable pivot 30 and securable pivot 32 permit the respective angular position of each of reflectors 24 and 26 to be independently properly aligned in both the horizontal and vertical planes, after which they may be secured (by a screw or other latching means) in their respective properly aligned position. Specifically, when reflectors 24 and 26 occupy their respective properly aligned angular positions, the horizon of the virtual image of reflector 24 seen by the right eye 16 of the wearer is substantially co-linear with the horizon directly seen by the left eye 10 of the wearer. Further, when reflectors 24 and 26 occupy their proper aligned positions, reflectors 24 and 26 entirely block out the direct field of view which would be seen by right eye 16 in the absence of the corrective device, and, instead, right eye 16 sees a virtual image in reflector 24 of the field of view of additional angle of sight 28.

As shown in FIG. 2a, plane mirror reflector 24-1 is a first species of reflector 24 of FIG. 1, and as shown in FIG. 2b, plane mirror reflector 26-1 is a first species of reflector 26 of FIG. 1. The respective dimensions of plane mirror reflectors 24-1 and 26-1 are usually in the range of between $\frac{3}{4}$–$1\frac{1}{2}$ inches.

It has been found in practice, using respective plane mirrors (such as shown in FIG. 2a and FIG. 2b) as the reflectors 24 and 26 in the corrective device shown in FIG. 1, that the proper alignment angle for reflector 26 is about 50°±10° with respect to the normal to line 34 (FIG. 1) of the vertical eye plane of left eye 10 and right eye 16. The proper angle of alignment of reflector 24 is about 5° smaller than that of reflector 26 with respect to line 34, being about 45°±10°. The additional angle of sight 28 achieved in this case is about 25°. This additional angle of sight is very helpful to a patient suffering from right-lateral homonymous hemianopsia, being of particular benefit in facilitating reading ability. In this regard, it should be noted that light is reflected from first reflector 26 and then from reflector 24. This double reflection ensures that the normal left-to-right order of written English language is not reversed in the virtual image of reflector 24 (which is what is actually observed by the right eye 16 of the patient).

Although an additional angle of sight 28 of about 25° is very useful to the patient, it is usually quite a bit less than the angular value of the respective blind portions 14 and 22. The angular size of additional angle of sight 28 may be increased by utilizing concave cylindrical mirror reflector 24-2, shown in FIG. 3a, as reflector 24 in FIG. 1, and utilizing convex cylindrical mirror reflector 26-2, shown in FIG. 3b, as reflector 26 in FIG. 1. The radius of curvature of these mirrors is relatively large (approximately 3 inches for a mirror having height and width dimensions of about one and one-quarter inches). In this second species, shown in FIGS. 3a and 3b, the use of concave cylindrical mirror reflector 24-2 compensates for any blurring of the virtual image due to the use of convex cylindrical mirror reflector 26-2. At the same time, the use of convex cylindrical mirror reflector 26-2 increases the size of the field of view within additional angle of sight 28.

Reflectors 24 and 26 may take other forms than the respective species shown in FIGS. 2a and 2b and in FIGS. 3a and 3b. For instance, total internally reflecting prisms, rather than mirrors, may be utilized for either or both reflectors 24 and 26.

One patient suffering from right-lateral homonymous hemianopsia has found that the use of the corrective device shown in FIG. 1 results in a small blind spot to the right of the field of view of the left eye 10 sight-portion 12 and to the left field of view of right eye 16 additional-angle-of-sight 28 if, and only if, both his eyes and head are maintained completely immobile. However, in normal activity, where the eyes and head are nearly always moving slightly, he experiences no such blind spot in the overall field of view of both eyes.

What is claimed is:

1. A homonymous-hemianopsia corrective device for use by a partially blind person having uncorrected-vision over a limited angular field of view with respect to that of a non-blind person either all to the left side or, alternatively, all to the right side, said device comprising:

means including first and second spaced reflectors adapted to be disposed in front of a single one of the two eyes of said person,
   said first and second reflectors when so disposed blocking only the direct field of view of said single one of the two eyes and substituting therefor a virtual image of an additional angle of sight which is situated in front of the partially blind person and within the field of view of a non-blind person but outside of said limited angular field of view,
   whereby said person has corrected-vision overall field of view which is greater than said limited angular field of view and approaches the field of view of a non-blind person.

2. The corrective device defined in claim 1, wherein said first and second reflectors are adapted to be disposed in front of that single one of the left and right eyes which is opposite to the side of said limited angular field of view, whereby said single one of the two eyes is the right eye when said limited angular field of view is to the left side and said single one of the two eyes is the left eye when said limited angular field of view is to the right side.

3. The corrective device defined in claim 1, wherein said second reflector is aligned at an angle of 50°±10° with respect to the normal to a line connecting the eyes of said partially blind person thereby to reflect light which is incident on said second reflector directly from said additional angle of sight, to said first reflector, and
wherein said first reflector is aligned at an angle of 45°±10° with respect to said normal to said line thereby to further reflect said reflected light from said second reflector, which is incident on said first reflector, to said single one of said two eyes as said virtual image.

4. The corrective device defined in claim 3, wherein both said first and second reflectors are plane mirrors.

5. The corrective device defined in claim 3, wherein said first reflector is a concave mirror and said second reflector is a convex mirror.

6. The corrective device defined in claim 1, wherein each of said first and second reflectors include securable pivots for independently aligning each of said first and second reflectors into proper positions for providing said overall field of view and then securing said first and second reflectors in said proper positions.

* * * * *